US010865762B1

(12) United States Patent
Vojnovic

(10) Patent No.: US 10,865,762 B1
(45) Date of Patent: Dec. 15, 2020

(54) SCALABLE FLUID GENERATOR ARRAY

(71) Applicant: Mirko Dusan Vojnovic, Campbell, CA (US)

(72) Inventor: Mirko Dusan Vojnovic, Campbell, CA (US)

(73) Assignee: Mirko Dusan Vojnovic, Campbell, CA (US)

( * ) Notice: Subject to any disclaimer, the term of this patent is extended or adjusted under 35 U.S.C. 154(b) by 0 days.

(21) Appl. No.: 16/712,793

(22) Filed: Dec. 12, 2019

Related U.S. Application Data

(60) Provisional application No. 62/779,850, filed on Feb. 14, 2018.

(51) Int. Cl.
| | | |
|---|---|---|
| *F03B 13/08* | (2006.01) | |
| *H01M 10/46* | (2006.01) | |
| *H02P 9/04* | (2006.01) | |
| *H02P 101/10* | (2015.01) | |

(52) U.S. Cl.
CPC ............. *F03B 13/08* (2013.01); *H01M 10/46* (2013.01); *H02P 9/04* (2013.01); *H01M 2220/10* (2013.01); *H02P 2101/10* (2015.01)

(58) Field of Classification Search
CPC ........ F03B 13/08; H02P 9/04; H02P 2101/10; H01M 10/46; H01M 2220/10
USPC ..................................................... 290/43, 54
See application file for complete search history.

(56) References Cited

U.S. PATENT DOCUMENTS

| | | | | |
|---|---|---|---|---|
| 4,319,142 A * | 3/1982 | Mayo, Jr. | .................. | E02B 9/00 290/52 |
| 4,345,159 A * | 8/1982 | Gutierrez Atencio | .. | F03B 13/08 290/43 |
| 4,437,017 A * | 3/1984 | Osterberg | ............... | F03B 13/10 290/52 |
| 4,467,216 A * | 8/1984 | Murphy | .................. | F03B 15/08 290/43 |
| 4,476,396 A * | 10/1984 | Calvert, Jr. | ............. | F03B 13/08 290/53 |
| 4,674,279 A | 6/1987 | Ali et al. | | |
| 6,396,162 B1 * | 5/2002 | Carrillo | .................... | F03B 13/08 290/43 |
| 7,084,521 B1 * | 8/2006 | Martin | ..................... | F03B 17/06 290/54 |
| 8,011,854 B1 * | 9/2011 | Millard | ................... | E02B 8/085 405/83 |
| 8,581,430 B2 | 11/2013 | Shifrin | | |
| 2008/0290663 A1 * | 11/2008 | Shifrin | .................. | F03B 13/105 290/52 |
| 2016/0084218 A1 * | 3/2016 | Obermeyer | ........... | F03B 13/105 415/1 |

FOREIGN PATENT DOCUMENTS

| | | |
|---|---|---|
| ES | 2423079 A2 | 7/2014 |
| WO | 2015067831 A1 | 5/2015 |

* cited by examiner

*Primary Examiner* — Charles Reid, Jr.

(57) ABSTRACT

Scalable Fluid Generator Array to utilize an adaptable grid of generators that are controlled by the end user's fluid demand, or available fluid supply, such that flow of fluid through every generator is always near optimum and working with maximum power conversion efficiency. The Fluid Generator Array is scalable to match the end user's power requirements.

10 Claims, 12 Drawing Sheets

SCALABLE FLUID GENERATOR ARRAY

CROSS-REFERENCE TO RELATED APPLICATIONS

This application claims the benefit of U.S. Provisional Application No. 62/779,850, filed 14 Dec. 2018 for Scalable Micro Hydro Generator System, which is incorporated by reference in entirety.

TECHNICAL FIELD

The present invention relates to the field of energy generation, and more particularly to a system and method for generating power through movement of fluid.

BACKGROUND ART

| Pat. No. | U.S. Patent Issue Date | Patentee |
|---|---|---|
| US8581430B2 | 2013 Nov. 12 | Salvatore Shifrin Joseph Shifrin |
| US4674279A | 1987 Jun. 23 | Ali, et al. |

| Patent Number | Country | Patent Issue Date | Patentee |
|---|---|---|---|
| E52423079A2 | Spain | 2014 Jul. 25 | Muro, et al. |
| WO2015067831A1 | International | 2015 May 14 | Sanchez |

Extraction of energy from moving fluid sources has been a desire of mankind for ages. Various methods involve water wheels, entrainment, and hydroelectric turbines. Existing systems are usually built around a single generator, optimally designed for available fluid flow at the particular site, and that fluid flow does not vary much.

Some prior art proposed solutions to achieving higher efficiency of turbine generators—for example, in U.S. Pat. No. 8,581,430B2 to Shifrin et, al. (2013) generator unit with modulating wicket gate angle and modulating runner blade pitch is proposed where wicket gate control mechanism controls the flow into the system, preconditions flow for maximum power and maintains water reservoir level. The runner blade pitch control mechanism monitors the system power output and adjusts blade pitch to achieve maximum power output.

U.S. Pat. No. 4,674,279A to Ali, et al. (1987) discloses a control system for the hydroelectric power plant of the run-of-river type wherein the load on the turbine generator unit(s) are matched to the flow of the river. It employs reservoir water level sensors that provide signals indicative of changing water level, sensors for generator's electrical and thermal operating characteristics and provide signals to wickets to change the turbine power in response to changing river level within the safe and allowable operating range of the generator. System can also employ a plurality of turbine-generator units in a hydroelectric power plant even though system can be fully operational with a single generator unit.

Spanish patent ES2423079A2 to Muro, et al. (2014) discloses the apparatus for generating electrical energy in pipelines for drinking water called "pumping". It is using a lower tank and an upper tank, which are joined by a single pipe. The upper tank is filled from the lower tank by a pump and the lower tank can be filled from the upper tank by running the water through a turbine. Both the pump and the turbine form a unified machine next to a motor, which is operated in reversible mode, either as a motor or as a generator. The invention also comprises a method that takes advantage of the difference in the price of electricity in valley hours and at peak hours, as well as reducing the peaks of the building's demand curve, thereby improving its energy efficiency.

International patent WO2015067831A1 to Sanchez (2015) discloses a device for generating electrical energy in pipelines for drinking water, by means of an Improved pipeline and an electrical generator with permanent neodymium magnets. It uses a single generator that is capable of changing the direction of rotation of the turbine impeller to apply more pressure to the drinking water supply network.

Prior Art Disadvantages:
  (a) Systems are not easily applicable for different settings and large variations of fluid flow in closed piping environments. Example: residential and commercial facilities with intermittent water usage.
  (b) Moreover, there has been no system using an array of small power cells working as a single adaptable system to capture the movement of fluid in such a way as to combine relatively small generators into one large power production system to increase system efficiency without a need to regulate generators' power output.
  (c) Existing systems are usually built around a single generator, optimally designed for available fluid flow at the particular site, and that fluid flow does not vary much.
  (d) Existing systems are not capable of substantially preserving fluid flow and pressure at the same time.
  (e) Existing systems are not configured so that non-operating power generators relieve overloading of already engaged and operating power generators.
  (f) In addition, specialized generators carry a significant cost, measured in thousands of dollars.
  (g) Most power generation systems are not designed, and therefore incapable, to account and adapt to large shifts of fluid flow without resorting to lowering fluid flow, mechanically altering generators characteristics or electronically regulating generator's power output. This is problematic because it increases cost and complexity which in turn affects the reliability of the system.
  (h) It also appears that when fluid flow falls significantly below optimum level, efficiency off the generator(s) is drastically reduced, sometimes to the point of non-operation, making the whole solution cost ineffective.

SUMMARY

In accordance with one embodiment, a Fluid Generator Array is presented for generating inexpensive power, which is extracted from moving fluid. It comprises an adaptable grid of miniature generators, valves and control circuitry that respond to user's fluid demand, or currently available fluid supply.

Advantages:

Accordingly, several advantages of one or more aspects are as follows: to provide an array of multiple generators such that flow of fluid through every mini generator is always near optimum. Such array is configured so that operating generators relieve overloading of already engaged and operating generators by opening additional parallel branches as needed. Such array has maximum level of power conversion efficiency and best utilizes available resources.

The whole array is scalable to match user's power requirements. The array of multiple generators can serve as stand-alone power generator unit in case of power outage, or as supplemental generator unit to provide power during peak demand hours, thus reducing the cost of electricity bills. Individual generators that are used to build Fluid Generator Array can be generic, mass produced, thus less expensive than their specialized counterparts.

One of the embodiments envisions a Fluid Generator Array that can be used in tandem with local electrical supply grid by having centrally located battery storage and AC inverter to connect the array to electrical grid and/or end user (FIG. 4). Overall design is relatively inexpensive and simple to install in existing residential or commercial environments (FIG. 3).

Other advantages of one or more aspects will be apparent from a consideration of the drawings and ensuing description.

DESCRIPTION OF THE DRAWINGS-FIGURES

DESCRIPTION OF THE DRAWINGS - REFERENCE NUMERALS

Figure 1:
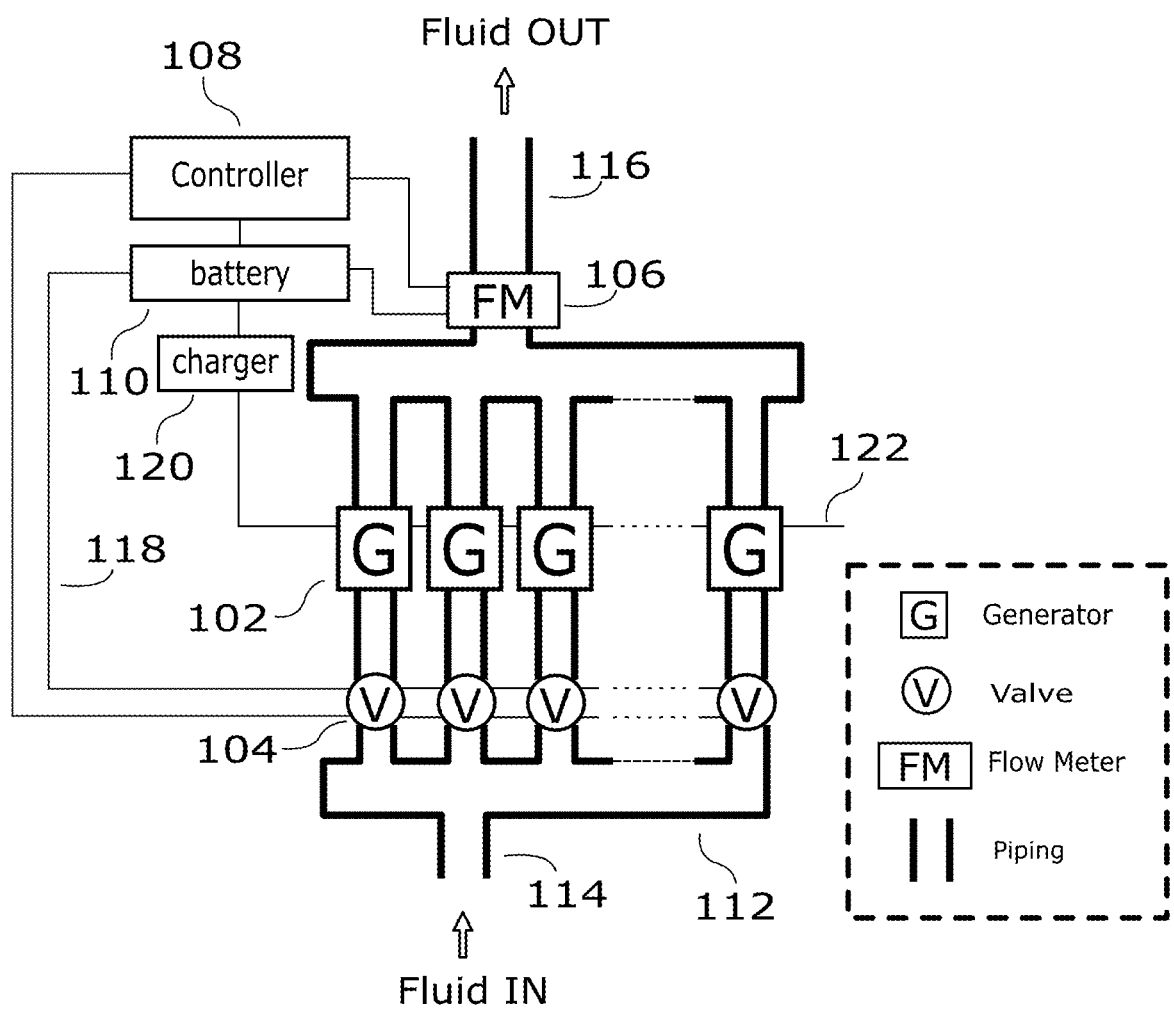
FIG. 1 shows components of the Fluid Generator Array first embodiment and mechanical interconnection of components to fluid supply.

| 102 | generator cluster | 104 | valve cluster |
| --- | --- | --- | --- |
| 106 | flow meter | 108 | controller |
| 110 | internal battery | 112 | piping |
| 114 | inlet port | 116 | outlet port |
| 118 | electrical wiring | 120 | charger |
| 122 | electrical output | 202 | generator |
| 204 | positive electrical output | 206 | negative electrical output |
| 208 | diode | 302 | mechanical valves |
| 304 | pre-existing piping | 402 | Fluid Generator Array |
| 404 | charge controller | 406 | battery storage |
| 408 | AC inverter | 410 | main electrical service panel |
| 412 | electrical meter | 414 | electrical power grid |
| 416 | end user | 702 | volt meter or comparator |

DESCRIPTION OF THE DRAWINGS - REFERENCE NUMERALS
-continued

| 802 | rotation meter | 902 | external power supply |
| --- | --- | --- | --- |
| 1002 | Fluid Generator Array subassembly | 1004 | main input conduit |
| 1102 | current limiter | 1204 | AC to DC charger |

DETAILED DESCRIPTION—FIG. 1 AND FIG. 2—FIRST EMBODIMENT

Figure 2:
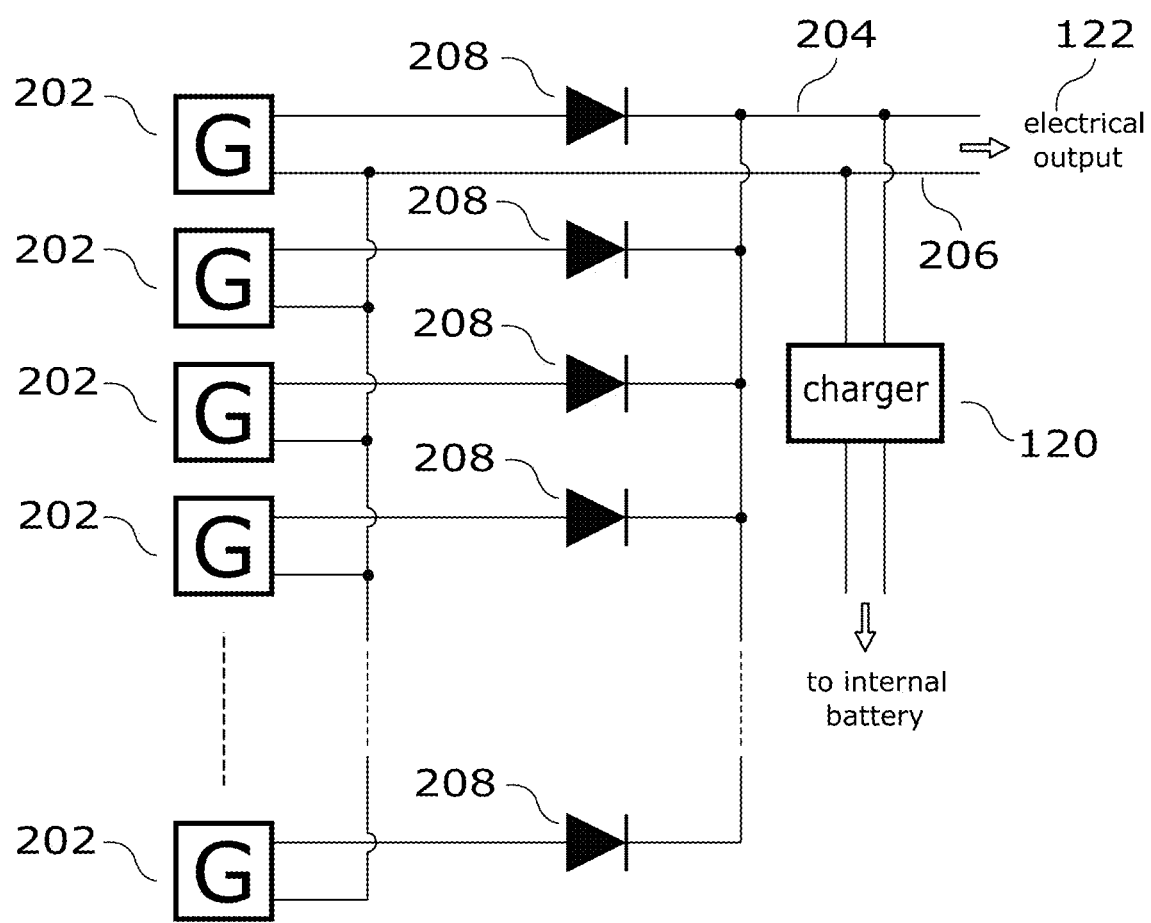
FIG. 2 shows individual electrical generators interconnections within Fluid Generator Array.

One embodiment of Fluid Generator Array is illustrated in FIG. 1 (interconnection of mechanical parts) and in FIG. 2 (electrical connections of generators in parallel). The Fluid Generator Array comprises: multiple or a cluster of generators 102 (FIG. 1), valves 104, a flow meter 106, a controller 108, an internal battery 110, piping 112, an inlet port 114, an outlet port 116, electrical wiring 118, a charger 120 and a generator cluster 102 electrical output 122.

Inlet port 114 (FIG. 1) is connected to parallel piping 112 that are mechanically connected to parallel cluster of valves 104. Valves 104 are then mechanically connected via piping 112 to parallel cluster of generators 102. Generator cluster 102 outlets are then mechanically connected via piping 112 to flow meter 106. Flow meter 106 is mechanically connected via additional piping to outlet port 116.

A means for measuring predetermined flow of turbines in the form of said Flow Meter 106 (FIG. 1) is electrically connected via electrical wiring 118 to internal battery 110 and controller 108. Internal battery 110 is electrically connected via electrical wiring 118 to controller 108, flow meter 106, valves 104 and charger 120. Controller 108 is electrically connected to flow meter 106, internal battery 110 and valve cluster 104. Charger 120 is electrically connected to internal battery 110 and generator cluster 102. Generator cluster 102 is electrically connected to charger 120 and electrical output 122.

A plurality of power generating cells in the form of said Generator Cluster 102 of this embodiment can comprise individual hydro or hydro turbine direct current (DC) generators 202 (FIG. 2) preferably with low fluid-flow resistance. Generators 202 are small power, usually referred to as pico or micro generators and can be anywhere between five watts to several hundred watts. Number of generators in generator cluster 102 is determined by desired power output. Generators are connected in parallel, so their output currents are summed, thus creating more powerful electricity generation apparatus. Fluid is supplied to generators 202 via piping 112 and valve cluster 104.

FIG. 2 shows electrical connections among individual generators 202 into generator cluster 102 (FIG. 1). Generators 202 are connected in parallel via array of diodes 208 to form positive electrical output 204 and negative electrical output 206. Diodes 208 protect from current flowing from working generators' 202 positive output port into non-working generators' 202 positive output port. Positive electrical output 204 and negative electrical output 206 create generator cluster's electrical output 122. Generator cluster's 102 electrical output 122 is connected to the outside user interface and is also connected to charger 120 which in turn is connected to internal battery 110.

A plurality of actuatable fluid gates in the form of said Valve cluster 104 of this embodiment comprises individual valves that are closed and opened by controller 108. Valves can be normally open, or normally closed. Individual valves are preferably of solenoid type, or any other electrically actuated and controlled valve; mechanically, they can be of any type such as gate valve, globe valve, check valve, plug valve, ball valve, butterfly valve, needle valve, pinch valve or any other type of valve.

Flow meter 106 (FIG. 1) of this embodiment can be of any type that provides output to controller 108. Various types of flow meters can be used including, but not limited to differential pressure flow meters, velocity flow meters, positive displacement flow meters, mass flow meters, pilot tubes, calorimetric flow meters, turbine flow meters, vortex flow meters, electromagnetic flow meters, ultrasonic Doppler flow meters, thermal flow meters, or any type of open channel flow meters such as—weirs, flumes, submerged orifices, current meters, acoustic flow meters and more.

An electronic means in the form of said Controller 109 (FIG. 1) of this embodiment can be microprocessor based, microcontroller based or fixed hardware logic based and it is designed to receive and interpret input from flow meter 106. Controller 109 is also designed to have electrical outputs that open and close valves 104.

Internal battery 110 (FIG. 1) includes without limitation: Lithium-ion (U-ion), Nickel Cadmium (Ni—Cd), Nickel-Metal Hydride (Ni-MH), Alkaline or Lead-Acid batteries.

Charger 120 (FIG. 1) of this embodiment can be, but it is not limited to unregulated current chargers, constant current chargers or pulse chargers. Charger output voltage must match battery rated voltage.

Diode 208 (FIG. 2) of this embodiment can be, but it is not limited to silicon and germanium diodes. Diode must be chosen to withstand maximum and peak current rating of individual generators 202, as well as reverse breakdown voltage that develops between operating and non-operating generators 202.

Inlet port 114 (FIG. 1) of this embodiment is designed to interface without leaks with fluid source. Its shape and construction varies and depends on fluid source interface.

Outlet port 116 (FIG. 1) of this embodiment is designed to interface without leaks with fluid drain. Its shape and construction varies and depends on fluid drain interface.

Piping 112 (FIG. 1) of this embodiment can be made of, but it is not limited to, copper, steel, cast iron, galvanized iron, wrought iron, PVC, plastic. Piping 112 must be designed to withstand corrosion and fluid pressures in the system without leaks.

Electrical output 122 (FIG. 1 and FIG. 2) consists of electrical wires and connector terminals to the outside user. Wires must be designed to carry maximum rated current output of the generator cluster. Output terminals must have the same current rating as wires and be fashioned to provide easy connection to the outside user's equipment.

Operation—FIGS. 1, 2

Important startup condition is that at least one valve 104 (FIG. 1) is open to allow flow of fluid through the system at the time fluid starts flowing.

When flow meter 106 detects flow of fluid (e.g., somebody turns on the shower), it sends information of the amount of fluid flowing to the controller 108.

Controller 108 determines how many channels need to be opened based on optimum flow for specific generators 202 used, and opens and closes valves 104 in parallel channels, so that fluid flow is optimal through the open channel(s). If fluid flow increases over certain limit (typically at the upper range of optimum flow) by increased demand (e.g. more faucets are turned on), controller 108 opens adequate number of parallel channels (valves 104) to meet that demand so it maintains optimal flow through opened channels.

By having multiple parallel channels, fluid pressure and flow is maintained and is minimally affected by generators 202 which are designed to have low flow resistance.

When flow meter 106 detects that there is no more flow of fluid, controller 108 keeps open at least one valve in valve cluster 104, and cycle is ready to repeat.

Power generated during active cycle is partially diverted to charger 120 which recharges the internal battery 110 and stored charge is used to operate the Fluid Generator Array; thus, Fluid Generator Array does not require outside power source. The rest of the power is output for consumption or storage via electrical output 122.

Additional Embodiments—FIGS. 5-10

Additional embodiments are shown in FIGS. 5, 6, 7, 8, 9 and 10.

Figure 5:
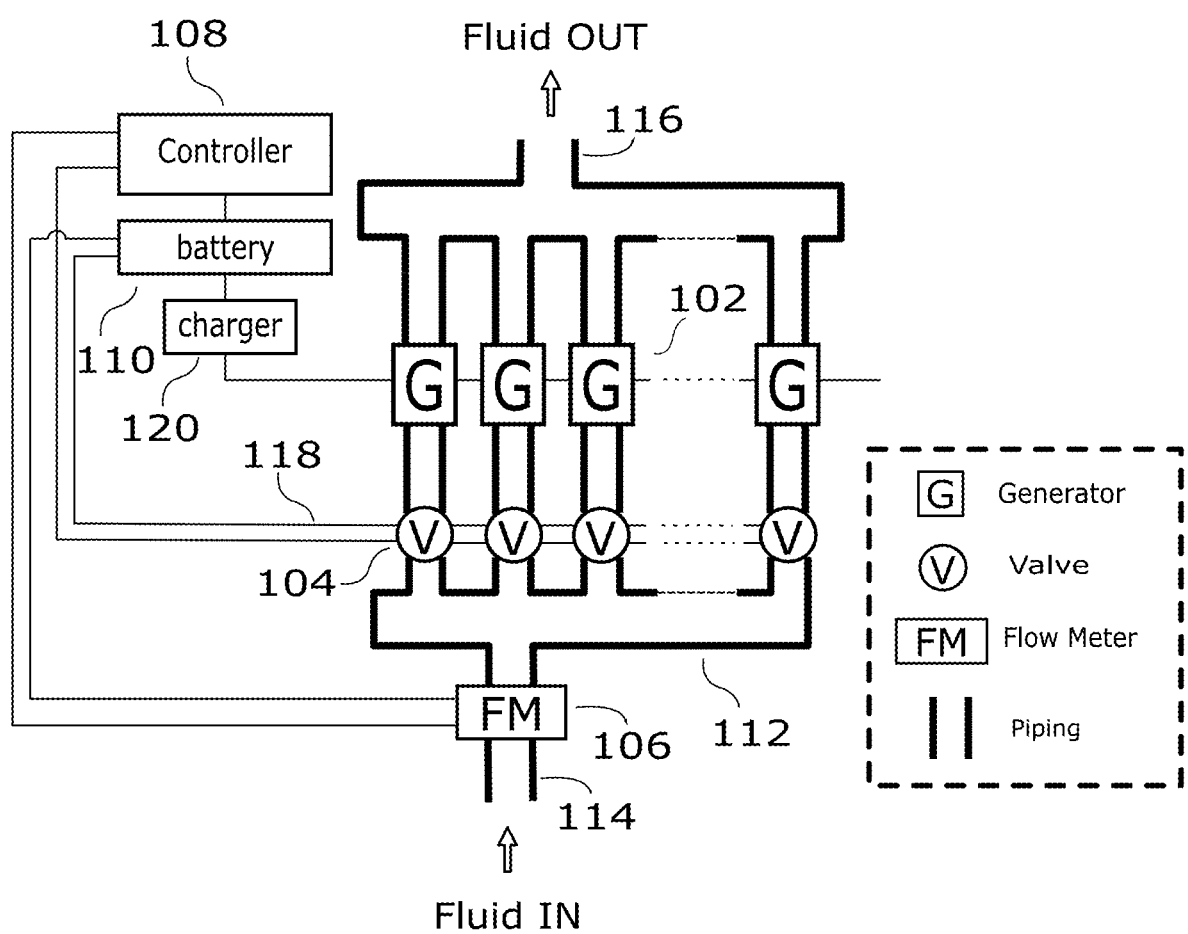
FIG. 5 shows components of the Fluid Generator Array additional embodiment for utilization in available fluid supply environments and mechanical interconnection of components to fluid supply.

In FIG. 5 the flow meter 106 is placed at the input side of the Fluid Generator Array. This embodiment may be used with installations where fluid flow depends on presently available fluid (e.g. sewer fluid flow, or rain flow), as well as in installations where fluid flow is dictated by the end user's fluid demand (e.g. opening household faucets). The operation is the same as in the First Embodiment.

Figure 6:
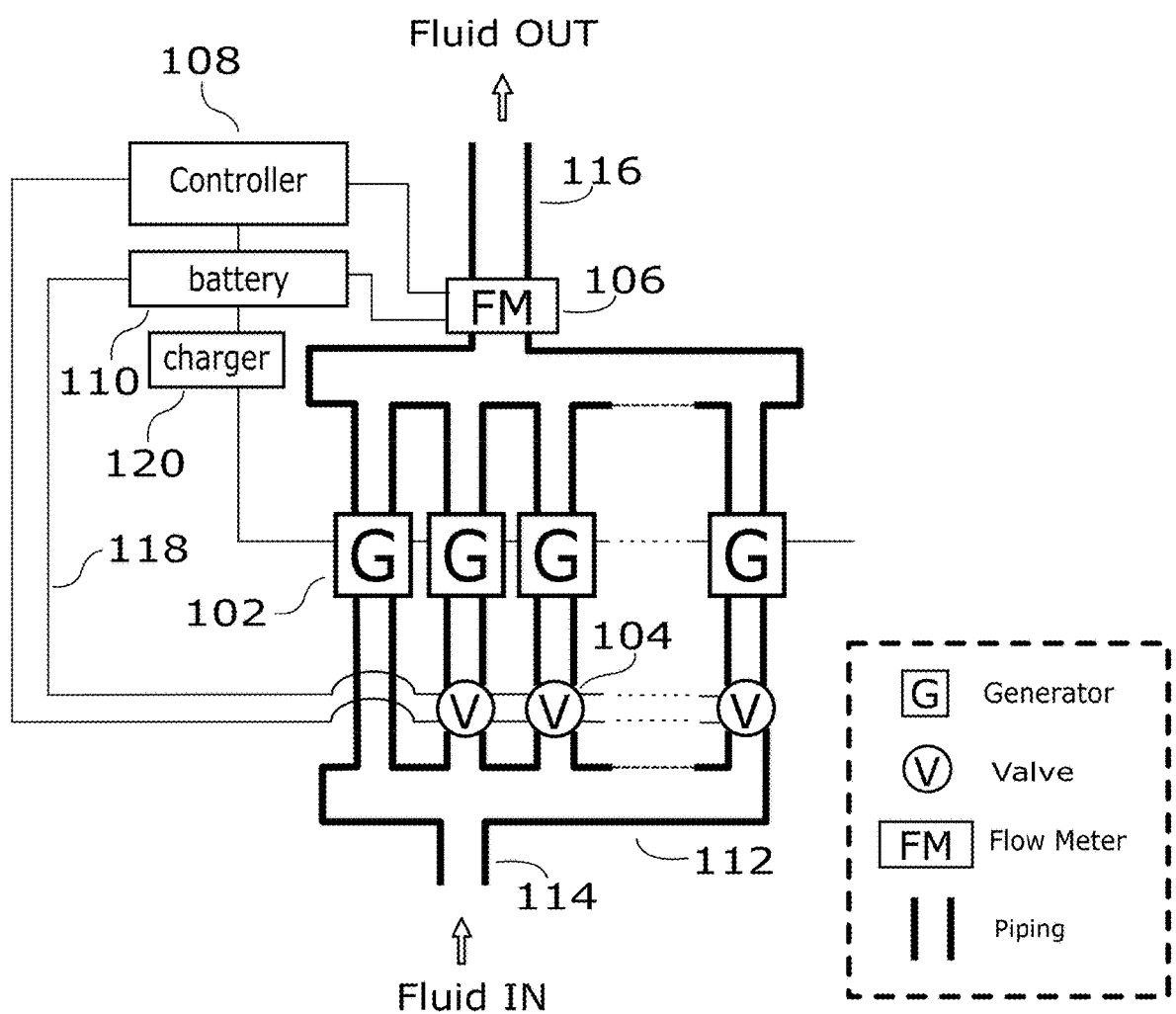
FIG. 6 shows components of the Fluid Generator Array additional embodiment without valve in first branch and mechanical interconnection of components to fluid supply.

In FIG. 6 valve in one of the parallel channels is missing and branch is constantly open. This embodiment always provides for proper start up condition, reduces number of valves and decreases cost of the overall system. It also allows for usage of normally closed valves which are more common and thus less expensive than normally opened valves. Normally closed valves do not need to be electrically energized when non operational, thus internal battery 110 life is prolonged.

Figure 7:
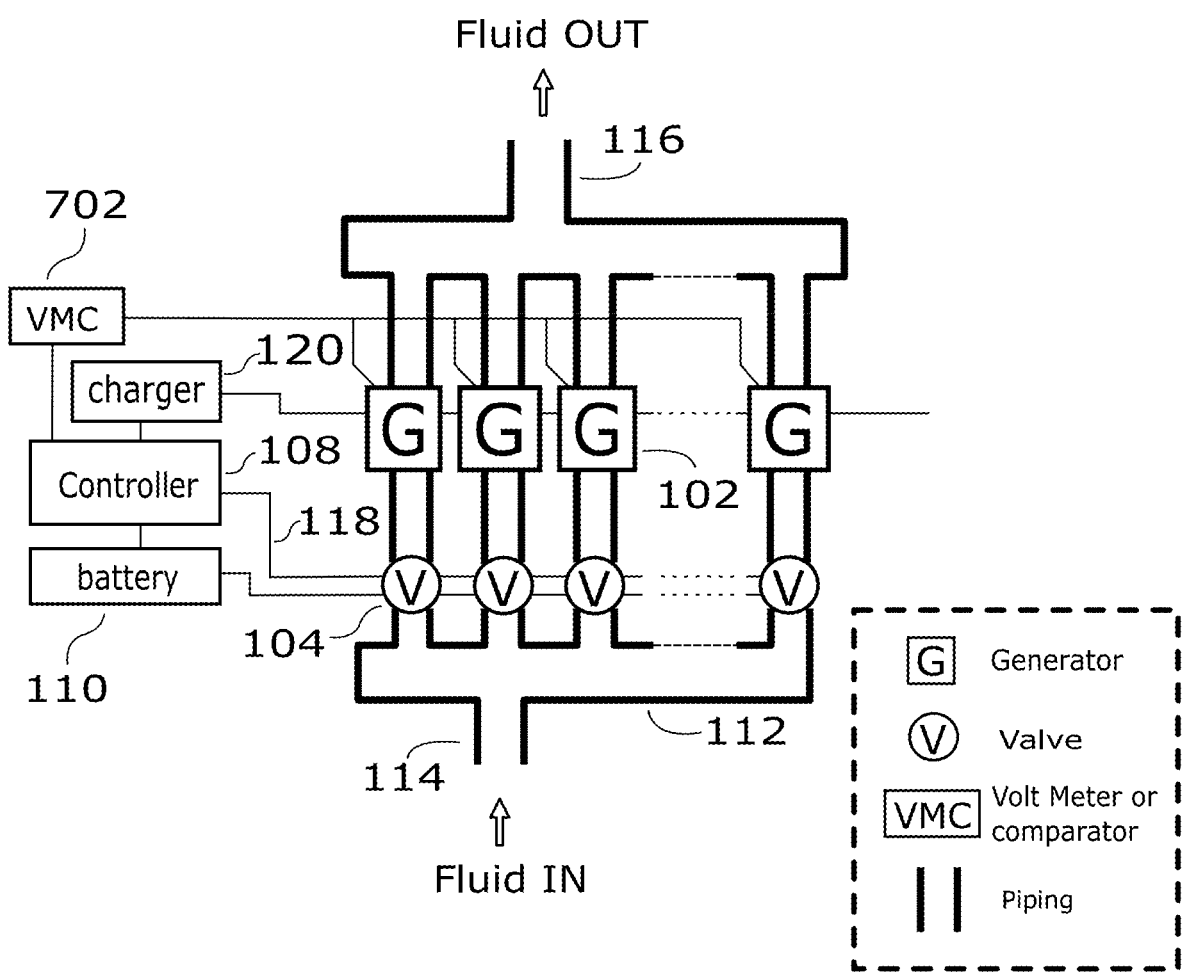
FIG. 7 shows components of the Fluid Generator Array additional embodiment with voltmeter and mechanical interconnection of components to fluid supply.

In FIG. 7 voltmeter or comparator 702 is used to determine when the controller 108 needs to open additional channels. Each generator shall have its nominal output voltage specified. When that voltage is exceeded by a few percent, controller 108 opens additional channels. Voltmeter or comparator 702 can also be designed as series of voltmeters and comparators individually connected to each generator. Depending on number of available controller 108 inputs, outputs from voltmeters or comparators can be connected directly to the controller 108; or by using some "glue logic" encoded to minimize the number of controller 108 inputs.

Figure 8:
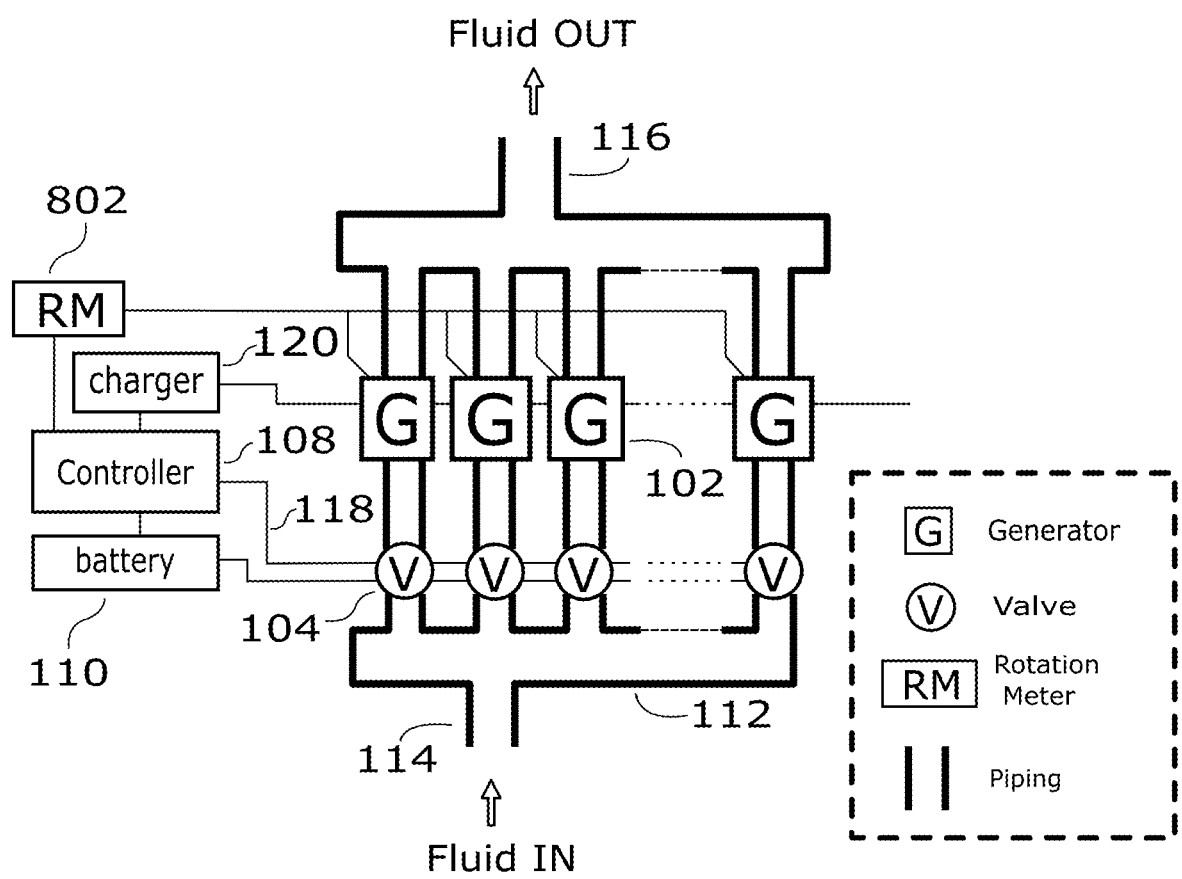
FIG. 8 shows components of the Fluid Generator Array additional embodiment with rotation meter and mechanical interconnection of components to fluid supply.

In FIG. 8 array of rotation meters 802 can be connected to each generator to signal speed of rotation of each generator. Each generator has optimum speed of rotation specified and when that speed is exceeded by few percentages, controller 108 opens additional channels.

Figure 9:
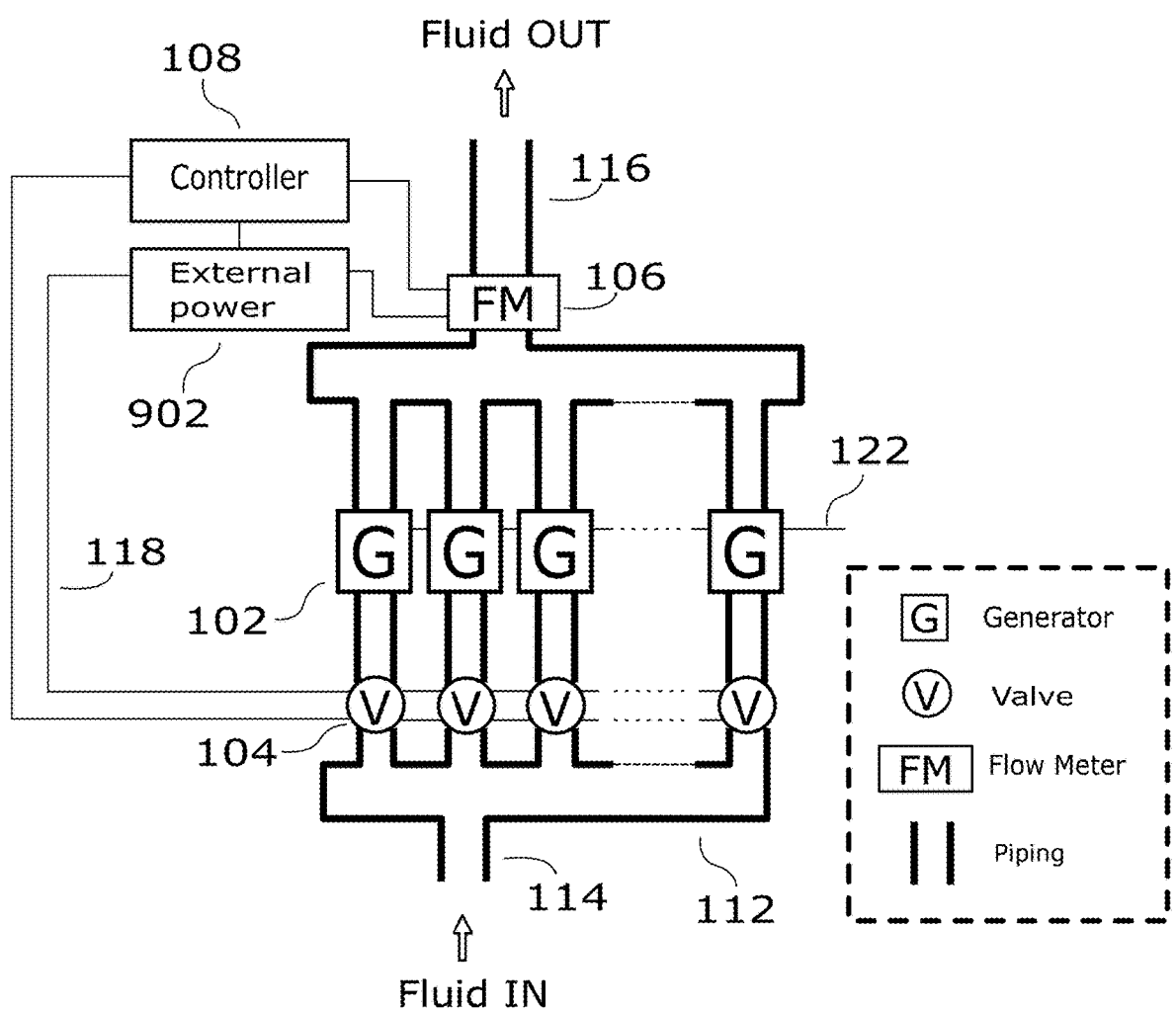
FIG. 9 shows components of the Fluid Generator Array additional embodiment with external power supply and mechanical interconnection of components to fluid supply.

In FIG. 9 Fluid Generator Array embodiment is shown with external power supply 902 (FIG. 9) and without internal battery 110 (FIG. 1) and charger 120 (FIG. 1). Depending on availability of the external power supply 902 (FIG. 9), in certain installations, it may be more economically advantageous to produce the Fluid Generator Array without those two components.

Figure 10:
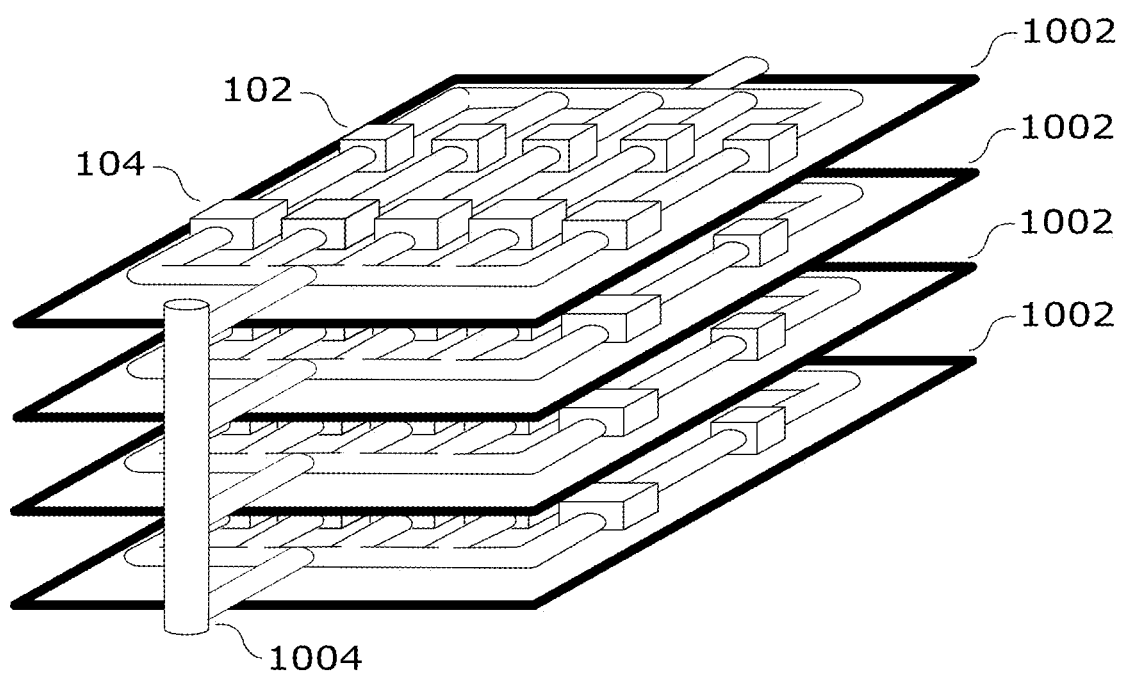
FIG. 10 shows Fluid Generator Array subassembly vertical stacks.

In FIG. 10 vertical stacking of Fluid Generator Array subassemblies 1002 is shown. Individual generators in generator cluster 102 (FIG. 1) can be connected in parallel horizontally; and then horizontal subassemblies stacked and connected vertically to meet desired power output.

Figure 11:
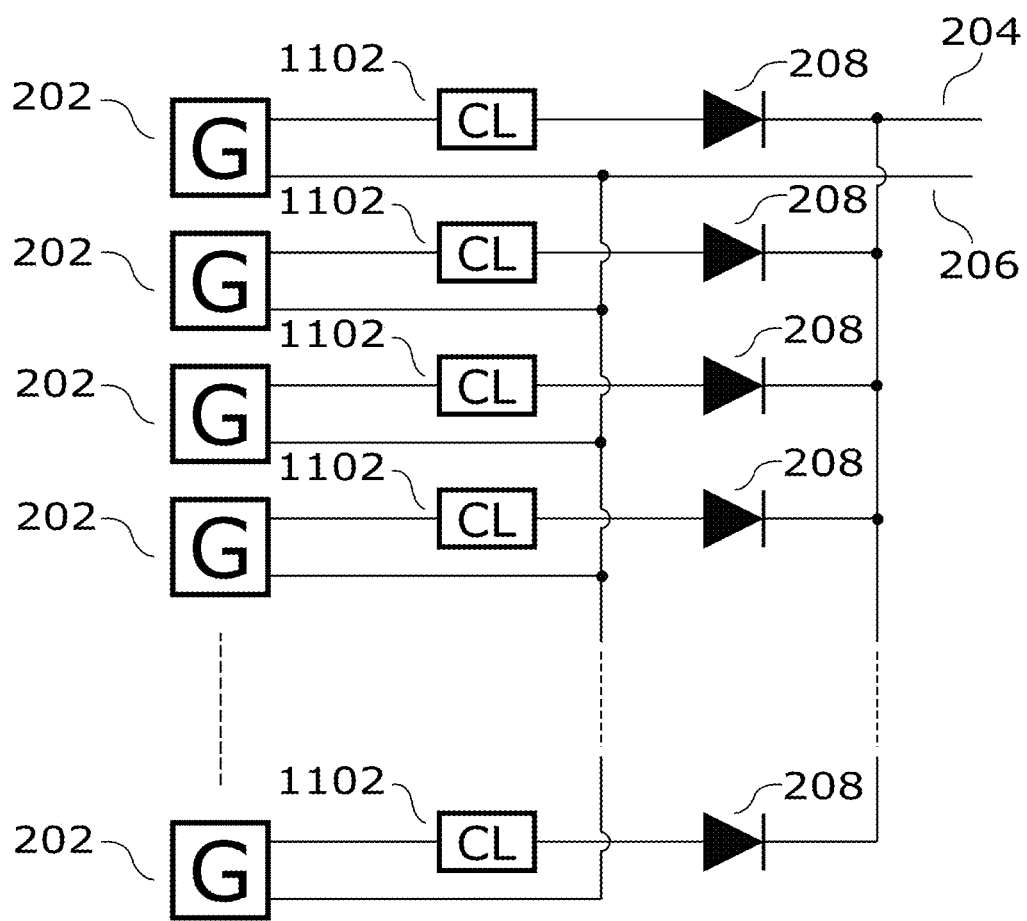
FIG. 11 shows individual electrical generators connections within array with current limiters.
Figure 12:
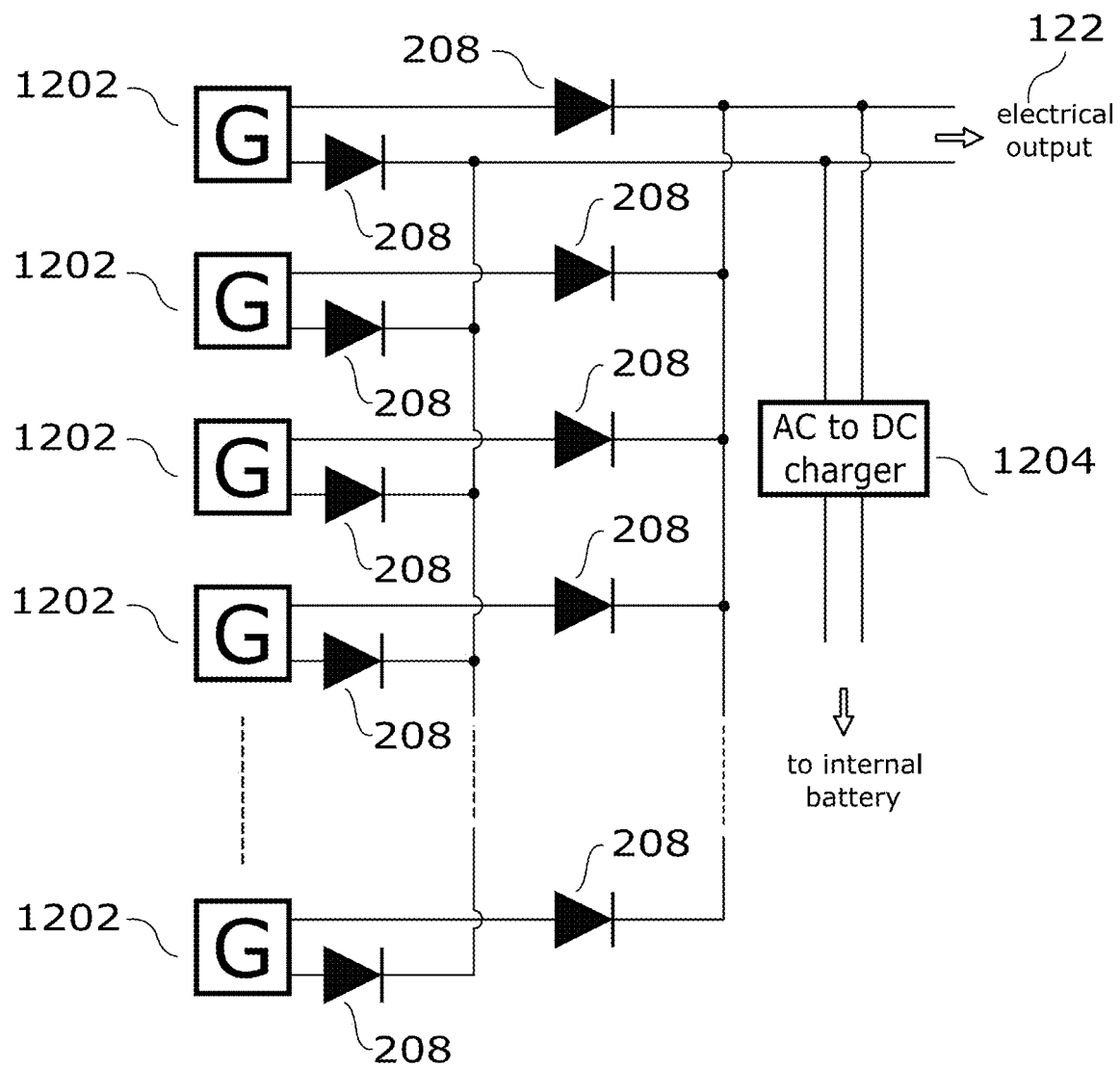
FIG. 12 shows individual AC electrical generators interconnections within Fluid Generator Array.

Alternative Embodiments—FIG. 11 and FIG. 12

There are various possibilities with regard of utilizing different types of generators.

In FIG. 11 generator cluster is shown where an output of each generator is connected to current limiter 1102. Every generator has counter-electromotive force (CEMF) that opposes its rotation. This CEMF is proportional to counter electromagnetic field which is directly proportional to generator's output current. In some applications where low fluid flow resistance is required, it may be desirable to install current limiters 1102 to minimize CEMF.

In FIG. 12 generator cluster is shown where alternating current (AC) generators 1202 are used. In this embodiment additional diodes 208 are needed on each generator output port to protect from current flowing into non-working generators 1202 ports.

Advantages:

From the description above, a number of advantages of some embodiments of my Fluid Generator Array become evident:

(a) Fluid Generator Array is scalable horizontally and/or vertically so it can meet various power demands.

(b) Fluid Generator Array is adaptable so it can utilize a wide range of fluid flow usages in single installation.

(c) Fluid Generator Array is always operating at generator's optimum fluid flow thus increases overall generation efficiency.

(d) Fluid Generator Array has parallel channels thus minimally affecting fluid flow and pressure.

(e) Fluid Generator Array is built with readily available components whose overall cost is less than the cost of single specialized fluid generator.

(f) Fluid Generator array can be easily installed into pre-existing installations, both mechanically and electrically.

Figure 3:
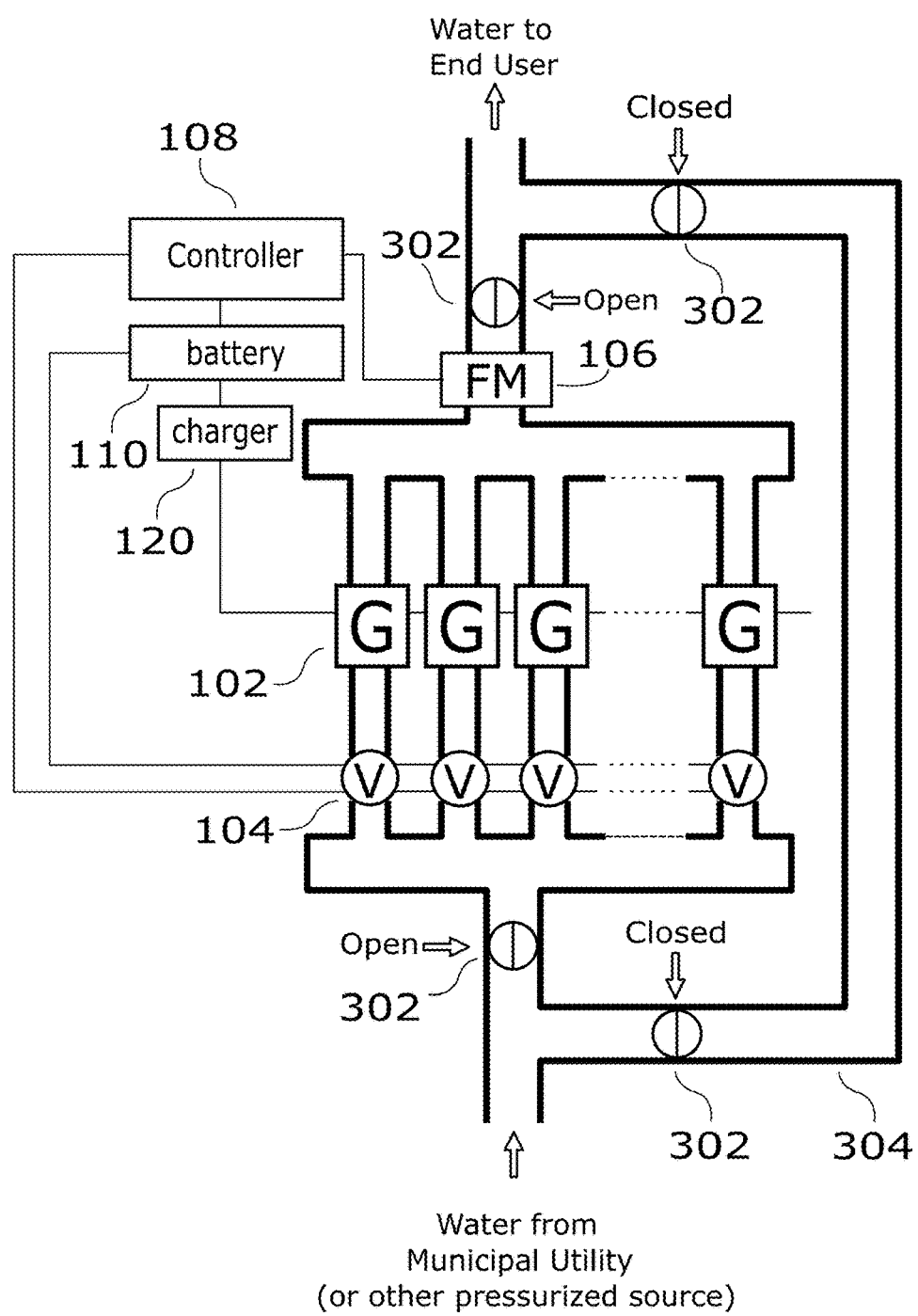
FIG. 3 shows Fluid Generator Array typical on-site mechanical installation.

FIG. 3 shows typical installation of Fluid Generator Array into the pre-existing piping 304. Mechanical valves 302 (FIG. 4) are used to bypass the system during maintenance or failure. Automated fault detectors can be engineered into the system which can operate bypass mechanical valves 302 in case of Fluid Generator Array failure. In that case mechanical valves 302 must be replaced with any adequate electrically actuated valves.

Figure 4:
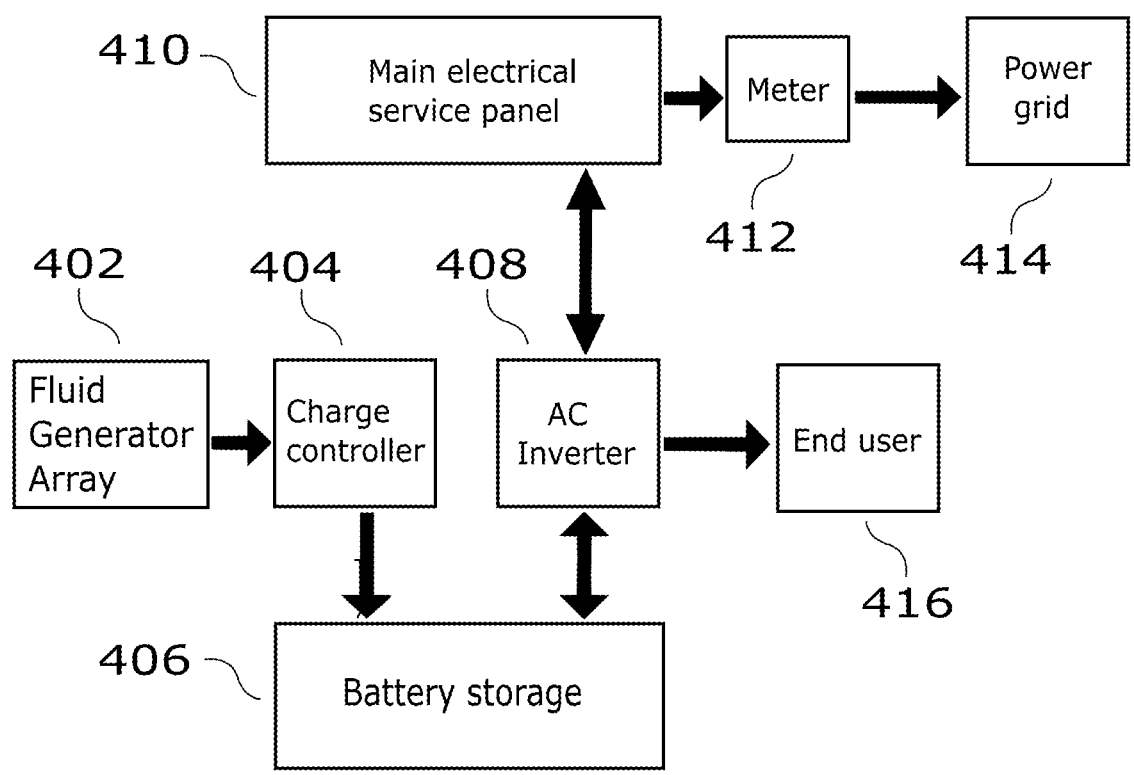
FIG. 4 shows one possible electrical interconnection of components to end user and electrical power grid.

FIG. 4 shows how the power generated during the active cycle is stored in designated battery storage 406 (if the system is "off grid"), and/or supplied to the end user 416, and/or returned to electrical power grid 414 via AC inverter 408 (similar to the way solar panels are connected to electrical power grid).

CONCLUSIONS, RAMIFICATIONS AND SCOPE

Accordingly, the reader will see that at least one embodiment of the Fluid Generator Array provides more efficient power generation apparatus in installations where fluid flow varies significantly. Such apparatus can be used in variety of domestic and industrial applications where fluid usage is part of normal operation.

Furthermore, the Fluid Generator Array has the additional advantages in that:

it provides an array of multiple generators such that flow of fluid through every mini generator is always near optimum.

it provides maximum level of power conversion efficiency and best utilizes available resources.

it has parallel channels thus minimally affecting fluid flow and pressure.

it is scalable in size and number of individual generators horizontally and/or vertically, so it can meet various power demands.

it is adaptable so it can utilize a wide range of fluid flows in single installation.

It comprises individual generic generators, which are mass produced, thus less expensive than their specialized counterparts.

it is built with readily available components whose overall cost is less than the cost of single specialized fluid generator.

it can serve as standalone power generator and to charge batteries and battery storages.

it can serve as standalone power generator unit in case of power outage, or as supplemental generator unit to provide power during peak demand hours, thus reducing the cost of electricity bills.

it can be easily installed into pre-existing installations, both mechanically and electrically.

An apparatus for power generation through movement of fluid comprising: a plurality of power generating cells; a plurality of actuatable fluid gates; a piping; a means for measuring predetermined optimum rotation of turbines within said plurality of power generating cells; an electronic means capable of (i) an electronic process of storing and executing power optimization algorithm, (ii) interpreting input from said means for measuring predetermined optimum rotation of said turbines, and (iii) controlling said actuatable fluid gates, operating so that flow of fluid is kept approximately at optimum or near optimum for said plurality of power generating cells; said piping capable of providing an input path for receiving moving fluid at an inlet, branching moving fluid through said apparatus, mechanically connecting said plurality of power generating cells and said plurality of actuatable fluid gates, and providing an output path for moving fluid at an outlet; said plurality of actuatable fluid gates capable of opening and closing paths for flow of fluid through said plurality of power generating cells; said plurality of actuatable fluid gates is mechanically connected to said plurality of power generating cells via said piping; said means for measuring predetermined optimum rotation of said turbines, connected such that it collects information from said plurality of power generating cells or from fluid flow, and sends information to said electronic means; said electronic means connected to said plurality of actuatable fluid gates such that it controls opening and closing of paths for flow of fluid through said plurality of power generating cells; said plurality of power generating cells comprising of individual cells in an electrically interconnected modular arrangement; said plurality of power generating cells comprising of said cells in a mechanically interconnected modular arrangement; said plurality of power generating cells where said cells operate independently of each other, or jointly, within said plurality of power generating cells and are interchangeable with each other in a plurality of positions within said plurality of power generating cells; whereby said plurality of power generating cells are positioned to receive kinetic energy from the movement of fluid, wherein said plurality of power generating cells convert said energy by the movement of said turbine within each said cell.

The means for measuring predetermined optimum rotation of turbines is replaced by a means for quantification of bulk fluid movement where said means for quantification of bulk fluid movement is mechanically connected at said inlet or at said outlet; the apparatus further including electronic gates connected such that they are capable of preventing electrical loading of non-operable said power cells; a backup battery capable of providing power to said apparatus for its operation; a charger connected such that it retrieves power generated by said plurality of power generating cells and charging said backup battery; at least one or multiple electronic gates connected such that they are capable of preventing electrical loading of non-operable said power cells; a backup battery capable of providing power to said apparatus for its operation; a charger connected such that it retrieves power generated by said plurality of power generating cells and charging said backup battery.

A method for increasing efficiency of power generation through movement of fluid while preserving Intensity of flow and pressure of moving fluid comprising: a plurality of power generating cells; a plurality of actuatable fluid gates; a piping; a means for measuring predetermined optimum rotation of turbines within said plurality of power generating cells; an electronic means capable of (i) an electronic process of storing and executing power optimization algorithm, (ii) interpreting input from said means for measuring predetermined optimum rotation of said turbines, and (iii) controlling said actuatable fluid gates, operating so that flow of fluid is kept approximately at optimum or near optimum for said plurality of power generating cells; said piping capable of providing an input path for receiving moving fluid at an inlet, branching moving fluid through said apparatus, mechanically connecting said plurality of power generating cells and said plurality of actuatable fluid gates, and providing an output path for moving fluid at an outlet; said plurality of actuatable fluid gates capable of opening and closing paths for flow of fluid through said plurality of power generating cells; said plurality of actuatable fluid gates is mechanically connected to said plurality of power generating cells via said piping; said means for measuring predetermined optimum rotation of said turbines connected such that it collects information from said plurality of power generating cells or from fluid flow, and sends information to said electronic means; said electronic means connected to said plurality of actuatable fluid gates such that it controls opening and closing of paths for flow of fluid through said plurality of power generating cells; said plurality of power generating cells comprising of Individual cells in an electrically interconnected modular arrangement; said plurality of power generating cells comprising of said cells in a mechanically interconnected modular arrangement; said plurality of power generating cells where said cells operate independently of each other, or jointly, within said plurality of power generating cells and are interchangeable with each other in a plurality of positions within said plurality of power generating cells; said plurality of power generating cells are positioned to receive kinetic energy from the movement of fluid, wherein said plurality of power generating cells convert said energy by the movement of said turbine within each said cell; whereby said plurality of power generating cells are configured such that said apparatus is (i) adaptable to utilize a wide range of fluid flow usages in a single installation, (ii) said apparatus is always operating at said power generating cells' optimum fluid flow, thus increased efficiency, (iii) said apparatus is configured to have adaptable parallel fluid flow paths thus minimally affecting fluid pressure and flow, and (iv) said power generating cells operating in configuration so that non operating power generating cells engage to receive excess fluid flow, in order to prevent overloading of already engaged and operating power generating cells.

An apparatus for power generation through movement of fluid comprising: a plurality of power generating cells arranged in parallel channels such that said apparatus prevents overloading or underutilization of said power generating cells by correspondingly opening or closing said parallel channels to keep approximately optimum flow of the fluid through each of said power generating cells.

A method for power generation through movement of fluid comprising a plurality of power generating cells arranged in parallel channels such that said apparatus prevents overloading or underutilization of said power generating cells by correspondingly opening or closing said parallel channels to keep approximately optimum flow of fluid through each of said power generating cells.

Although the description above contains many specifics, these should not be construed as limitations of the scope, but rather as an exemplification of one [or several] embodiment(s) thereof. Many other variations are possible. For example: valve cluster can be positioned after generator cluster in regards to directionality of fluid flow, or generator cluster can have two or more generators mechanically connected in series in regards to directionality of fluid flow. Accordingly, the scope should be determined not by the embodiment(s) illustrated, but by the appended claims and their legal equivalents.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the title, headings, terms and phrases used herein are not intended to limit the subject matter or scope; but rather, to provide an understandable description of the invention. The invention is composed of several sub-parts that serve as portion of the total functionality of the invention independently and contribute to system level functionality when combined with other parts of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not to be interpreted as a "means" or "step" clause as specified in 35 U.S.C. Sec. 112, Parag. 6. In particular, the use of "step of" in the claims herein is not intended to invoke the provisions of 35 U.S.C. Sec. 112, Parag. 6. Incorporation of Reference: All research papers, publications, patents, and patent applications mentioned in this specification are herein incorporated by reference to the same extent as if each individual publication, patent, or patent appl. was specifically and individually indicated to be incorporated by reference.

I claim:

1. An apparatus for power generation through movement of fluid comprising:
   a plurality of power generating cells;
   a plurality of actuatable fluid gates;
   a piping;
   a means for measuring predetermined optimum rotation of turbines within said plurality of power generating cells;
   an electronic means capable of (i) an electronic process of storing and executing power optimization algorithm, (ii) interpreting input from said means for measuring predetermined optimum rotation of said turbines, and (iii) controlling said actuatable fluid gates, operating so that flow of fluid is kept approximately at optimum or near optimum for said plurality of power generating cells;

said piping capable of providing an input path for receiving moving fluid at an inlet, branching moving fluid through said apparatus, mechanically connecting said plurality of power generating cells and said plurality of actuatable fluid gates, and providing an output path for moving fluid at an outlet;

said plurality of actuatable fluid gates capable of opening and closing paths for flow of fluid through said plurality of power generating cells;

said plurality of actuatable fluid gates is mechanically connected to said plurality of power generating cells via said piping;

said means for measuring predetermined optimum rotation of said turbines, connected such that said means for measuring collects information from said plurality of power generating cells or from fluid flow, and sends information to said electronic means;

said electronic means connected to said plurality of actuatable fluid gates such that said electronic means controls opening and closing of paths for flow of fluid through said plurality of power generating cells;

said plurality of power generating cells comprising of individual cells in an electrically interconnected modular arrangement;

said plurality of power generating cells comprising of said cells in a mechanically interconnected modular arrangement;

said plurality of power generating cells where said cells operate independently of each other, or jointly, within said plurality of power generating cells and are interchangeable with each other in a plurality of positions within said plurality of power generating cells;

whereby said plurality of power generating cells are positioned to receive kinetic energy from the movement of fluid, wherein said plurality of power generating cells convert said energy by the movement of said turbine within each said cell.

2. The apparatus of claim 1 where said means for measuring predetermined optimum rotation of turbines is replaced by a means for quantification of bulk fluid movement where said means for quantification of bulk fluid movement is mechanically connected at said inlet or at said outlet.

3. The apparatus of claim 2 further including electronic gates connected such that they are capable of preventing electrical loading of non-operable said power cells.

4. The apparatus of claim 2 further including a backup battery capable of providing power to said apparatus for operation.

5. The apparatus of claim 2 further including a charger connected such that the charger retrieves power generated by said plurality power generating cells and charging a backup battery.

6. The apparatus of claim 1 further including electronic gates connected such that they are capable of preventing electrical loading of non-operable said power cells.

7. The apparatus of claim 1 further including a backup battery capable of providing power to said apparatus for operation.

8. The apparatus of claim 1 further including a charger connected such that the charger retrieves power generated by said plurality of power generating cells and charging a backup battery.

9. A method for increasing efficiency of power generation through movement of fluid while preserving intensity of flow and pressure of moving fluid comprising:

a plurality of power generating cells;

a plurality of actuatable fluid gates;

a piping;

a means for measuring predetermined optimum rotation of turbines within said plurality of power generating cells;

an electronic means capable of (i) an electronic process of storing and executing power optimization algorithm, (ii) interpreting input from said means for measuring predetermined optimum rotation of said turbines, and (iii) controlling said actuatable fluid gates, operating so that flow of fluid is kept approximately at optimum or near optimum for said plurality of power generating cells;

said piping capable of providing an input path for receiving moving fluid at an inlet, branching moving fluid through said apparatus, mechanically connecting said plurality of power generating cells and said plurality of actuatable fluid gates, and providing an output path for moving fluid at an outlet;

said plurality of actuatable fluid gates capable of opening and closing paths for flow of fluid through said plurality of power generating cells;

said plurality of actuatable fluid gates is mechanically connected to said plurality of power generating cells via said piping;

said means for measuring predetermined optimum rotation of said turbines connected such that said means for measuring collects information from said plurality of power generating cells or from fluid flow, and sends information to said electronic means;

said electronic means connected to said plurality of actuatable fluid gates such that said electronic means controls opening and closing of paths for flow of fluid through said plurality of power generating cells;

said plurality of power generating cells comprising of individual cells in an electrically interconnected modular arrangement;

said plurality of power generating cells comprising of said cells in a mechanically interconnected modular arrangement;

said plurality of power generating cells where said cells operate independently of each other, or jointly, within said plurality of power generating cells and are interchangeable with each other in a plurality of positions within said plurality of power generating cells;

said plurality of power generating cells are positioned to receive kinetic energy from the movement of fluid, wherein said plurality of power generating cells convert said energy by the movement of said turbine within each said cell;

whereby said plurality of power generating cells are configured such that said apparatus is (i) adaptable to utilize a wide range of fluid flow usages in a single installation, (ii) said apparatus is always operating at said power generating cells' optimum fluid flow, thus increased efficiency, (iii) said apparatus is configured to have adaptable parallel fluid flow paths thus minimally affecting fluid pressure and flow, and (iv) said power generating cells operating in configuration so that non operating power generating cells engage to receive excess fluid flow, in order to prevent overloading of already engaged and operating power generating cells.

10. An apparatus for power generation through movement of fluid comprising:
a plurality of power generating cells arranged in parallel channels such that said apparatus prevents overloading or underutilization of said power generating cells by correspondingly opening or closing said parallel channels to keep approximately optimum flow of the fluid through each of said power generating cells.

\* \* \* \* \*